Patented Mar. 14, 1944

2,344,095

UNITED STATES PATENT OFFICE 2,344,095

THERAPEUTICALLY ACTIVE TETRAHYDRO-ISOQUINOLINE COMPOUNDS AND PROCESS FOR THEIR PRODUCTION

Fritz Külz, Frankfort-on-the-Main, Germany; vested in the Alien Property Custodian No Drawing. Application August 12, 1940, Serial No. 352,325. In Germany August 30, 1939

7 Claims. (Cl. 260—287)

The invention concerns new, therapeutically active tetrahydroisoquinoline compounds and processes for their production.

It has been found that tetrahydroisoquinoline compounds which are substituted in the hydrogenated pyridine nucleus by an aliphatic radical, substituted by a phenyl radical and only in one benzene ring by at least 2 acyloxy (esterified hydroxy) groups, have an analgesic effect. As aliphatic radicals, which are substituted by phenyl, aralkyl or aralkenyl rests may be used. The hydroxy groups may be esterified by formic acid, acetic acid, propionic acid, butyric acid or other organic acids. It is advantageous to employ acetylated compounds. The compounds may, however, carry further substituents, for example alkyl or alkenyl groups, in various positions of the molecule; for example they may be substituted in the hydrogenated pyridine ring or in one or both of the benzene nuclei or in several nuclei or in the aliphatic intermediate chain by methyl, ethyl, propyl, butyl, vinyl, propenyl, butenyl or the like radicals. Finally the compounds may be substituted at the benzene nucleus, which is free from acyloxy groups, by one free hydroxy group and/or one or more etherified hydroxy groups, for example alkoxy or alkylendioxy groups. The presence of more than one hydroxy group in the second benzene nucleus annuls the analgesic effect.

The new compounds may be prepared according to various methods. Tetrahydroisoquinoline compounds, which are substituted at the nitrogen by an aralkyl or aralkenyl group are prepared by adding on to the nitrogen atom of an isoquinoline, dihydroisoquinoline or tetrahydroisoquinoline the desired aralkyl or aralkenyl group. This addition may be effected by letting derivatives of aralkyl or aralkenyl alcohols, for example halogenides, benzene or toluene sulfonic acid esters or aldehydes or ketones (according to Leuckart-Wallach) act on the starting compounds, one of these reaction partners containing at least 2 acyloxy groups.

Starting from isoquinolines or dihydroisoquinolines quaternary salts are obtained during the addition of aralkyl or aralkenyl groups, which must be converted into the corresponding tetrahydroisoquinoline compounds by hydrogenation. Hydrogenation may be carried into effect according to the desired product by only hydrogenating the double bonds of the pyridine ring or both the double bonds of the aralkenyl substituents and the pyridine ring. Hydrogenation may be carried out catalytically, or, in the case of partial reduction, with metals, if desired in the presence of acids.

The compounds to be converted may be substituted besides by acyloxy groups by alkyl or alkenyl groups in any desired position. Furthermore the compound involved in reaction, which does not contain any acyloxy groups, may be substituted by one free hydroxy group and/or one or more etherified hydroxy groups, such as alkyloxy or alkylendioxy groups.

On the other hand tetrahydroisoquinoline compounds, which are substituted at one of the carbon atoms of the hydrogenated pyridine ring by an aralkyl or aralkenyl rest and in one of the two benzene rings by at least two acyloxy groups may be prepared by hydrogenation of corresponding, not completely hydrogenated compounds. As starting material for this hydrogenation non hydrogenated or dihydrogenated isoquinoline compounds, substituted at one of the carbon atoms of the pyridine ring by an aralkyl or aralkenyl group or their quaternary ammonium salts or tetrahydrogenated isoquinoline compounds, which are substituted at one of the carbon atoms of the hydrogenated pyridine ring by an aralkenyl group may be employed. All of these compounds must be substituted at the benzene nucleus by at least 2 acyloxy groups. Moreover they may contain further substituents, for example alkyl or alkenyl groups, in various positions of the molecule and may be substituted in the second benzene nucleus, which is free from acyloxy groups, by one free hydroxy group and/or its functional derivatives, such as alkyloxy or alkylendioxy groups.

For the preparation of tetrahydroisoquinoline compounds, which are substituted by aralkyl, one may proceed from various starting materials. Non hydrogenated or dihydrogenated isoquinoline compounds, which are substituted at one of the carbon atoms of the pyridine ring by aralkyl, which contain at least 2 acyloxy groups in one benzene nucleus and are, if desired, further substituted, or their quaternary ammonium salts may be hydrogenated in a manner known per se, whereby the double bonds of the pyridine ring are converted into single bonds. This hydrogenation either may be carried into effect by help of metals, for example zinc dust, if desired in the presence of the acid, by which the hydroxy groups are acylated, or catalytically, for example by help of platinum or palladium catalysts, such as platinum black, platinum oxyde, palladium, palladium black, palladium charcoal. One may, however, start from the corresponding, non hydrogenated isoquinoline compounds or dihydroisoquinoline compounds, which are substituted by an aralkenyl group, or their quaternary ammonium salts, and hydrogenate these starting materials catalytically, for example in the presence of platinum or palladium catalysts in such a manner that the double bonds of the pyridine ring, as well as the double bonds of the aralkenyl rest are converted into single bonds. Finally one may proceed from the corresponding tetrahydroisoquinoline compounds, which are substituted by an aralkenyl group and hydrogenate also these catalytically, the aralkenyl substituents being converted into aralkyl substituents.

If, on the other hand, tetrahydroisoquinoline compounds, substituted by an aralkenyl group of the kind described as above, are to be produced, non hydrogenated or dihydrogenated isoquinoline compounds, which are substituted at one of the carbon atoms of the pyridine ring by an aralkenyl group and which contain at least 2 acyloxy groups in the benzene nucleus and which are, if desired, furthermore substituted, or their quaternary ammonium salts are employed as starting materials and are hydrogenated with metals, if desired in the presence of the acid, with which the hydroxy groups are acylated, in such manner that only the double bonds of the pyridine ring are converted into single bonds, the double bonds of the aralkenyl substituents, however, are preserved.

The starting material for these hydrogenating processes may, for example, be obtained by condensation of, if desired, correspondingly substituted 1-methyl isoquinolines or 1-methyl-3,4-dihydroisoquinolines with, if desired, correspondingly substituted aromatic aldehydes or, by the Bischler-Napieralsky synthesis, from correspondingly substituted β-phenylethylamines.

Finally the tetrahydroisoquinoline compounds according to the invention, which are substituted by an aralkyl or aralkenyl group and at least 2 acyloxy groups, may be produced independently of their carrying the aralkyl or aralkenyl substituents at the nitrogen or at one carbon atom of the hydrogenated pyridine ring, by esterifying corresponding compounds with free hydroxy groups.

One may, however, for this production start from compounds, which, besides being substituted by an aralkyl or aralkenyl group in the hydrogenated pyridine ring and free hydroxy groups in one benzene nucleus are substituted by further substituents, for example alkyl and alkenyl groups in various positions of the molecule and/or in the second benzene nucleus by one free hydroxy group and/or its functional derivatives.

Esterification of the starting materials may, regardless whether secondary or tertiary tetrahydroisoquinolines (in respect of the amino group) are employed, be effected by heating with acid anhydrides or chlorides to temperatures of 80–90° C. and above, if desired under dilution with the acid, with which the hydroxy groups are to be acetylated. In the case of starting from secondary amines these must be employed in the form of their salts, in order to guarantee an acetylation only or mainly at the oxygen, temperatures not exceeding 90° C. being employed. Starting from tertiary amines the free bases and boiling temperatures may be employed. On the other hand in this case the treatment with acid anhydride or chloride may be carried out in the presence of tertiary bases, for example pyridine, and even in the cold.

In this manner acetoxy, propionyloxy and butyryloxy compounds, as well as compounds esterified with higher organic acids may be produced. In addition acetoxy compounds may be obtained by treatment of the starting products with ketene, while the formyl oxy compounds may be produced by boiling of the starting material with formic acid.

EXAMPLES (1) 7.1 grs. of hydrobromide of 1,3-dimethyl-6,7 - diacetoxy - 1,2,3,4 - tetrahydroisoquinoline, melting point 238–240° C. are dissolved in water and, mixed with potash. The free base is extracted with ether. 1.9 grs. of freshly produced γ-phenyl-allylbromide are added to the well dried ether solution. This mixture is heated to boiling under reflux for 5 hours. After evaporation of the ether the residue is heated to 100° C. for 30 minutes. This residue is again dissolved in ether, the hydrobromide of the initial base filtered with suction and the 1,3-dimethyl-2-(γ-phenylallyl)-6,7-diacetoxy-1,2,3,4-tetrahydroisoquinoline precipitated from the ether solution by ethereal hydrobromic acid. The hydrobromide precipitates amorphous and is dissolved in water. The solution is rendered alkaline with potash under cooling with ice. The base is extracted with ether and the ether residue distilled off in high vacuo. After first runnings of unchanged starting material 1.8 grs. of 1,3-dimethyl-2-(γ-phenylallyl)-6,7-diacetoxy-1,2,3,4-tetrahydroisoquinoline are distilled at 170–180° C. bath temperature as a colourless, non crystallizing resin, under a pressure of 0.004 mm. Hydrochloride and hydrobromide are also amorphous.

*Formula*

$$\text{CH}_3.\text{COO} - \underset{\text{HCH}_3}{\underset{|}{\bigcirc\!\!\!\bigcirc}} \overset{\text{H}_2}{\underset{}{}} \text{HCH}_3$$
$$\text{CH}_3.\text{COO} - \qquad\qquad \text{N}-\text{CH}_2-\text{CH}=\text{CH}-\text{C}_6\text{H}_5$$

(2) 2.2 grs. of 1,3-dimethyl-6,7-diacetoxy-1,2,3,4-tetrahydroisoquinoline, produced by acetylation of the hydrobromide of 1,3-dimethyl-6,7-dioxy-1,2,3,4-tetrahydroisoquinoline with acetic acid anhydride in glacial acetic acid, or by catalytic hydrogenation of the hydrobromide of 1,3-dimethyl-6,7-diacetoxy-3,4-dihydroisoquinoline in glacial acetic acid, dissolving the hydrobromide (melting point 240–242° C.) in water, rendering alkaline and extracting with ether, are heated to 60° C. for 6 hours, after 1.0 gr. of γ-phenyl-propyliodide have been added, under careful exclusion of moisture. After cooling the hydroiodide of the starting base is precipitated with ether. After first runnings the obtained base, which is dissolved in ether, is distilled off in high vacuo under 0.01 mm. pressure at 190–220° C. bath temperature. The base is solved in ether, filtrated and the 1,3-dimethyl-2-(γ-phenylpropyl)-6,7-diacetoxy-1,2,3,4-tetrahydroisoquinoline-hydrochloride is precipitated with hydrochloric acid in ether and melts at 154–156° C. after re-crystallization from methanol under the addition of absolute ether.

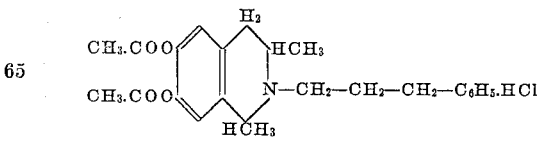

(3) 2.6 grs. of 1-methyl-6,7-diacetoxy-3,4-dihydroisoquinoline, produced by acetylation of 1-methyl-6,7-dioxy-3,4-dihydroisoquinoline - hydrobromide with acetic acid anhydride at 100° C., dissolving in water, precipitating with icy cold, saturated potassium carbonate solution and extraction with ether, are heated, together with 3.4 grs. of γ-phenyl-propyliodide to 70° C. for ½ hour. The mixture is triturated with ether and the obtained 1-methyl-2-(γ-phenylpropyl)-6,7-diacetoxy-3,4-dihydroisoquinolinium-iodide is re-crystallized from absolute alcohol. Hereon the quaternary salt, which melts at 194–196° C. is reduced by 2 hours' boiling with zinc dust in glacial acetic acid. After the hot zinc dust is filtered off with suction one precipitates the filtrate with ether, dissolves the precipitate in methanol and pours the solution into icy cold diluted ammonia. The precipitating base is extracted with ether. The ethereal solution is washed with icy cold, diluted soda lye and water, dried and evaporated. The residue, i. e. 1-methyl - 2 - (γ - phenylpropyl) - 6,7 - diacetoxy - 1,2,3,4-tetrahydroisoquinoline distills in high vacuo of 0.01 mm. pressure at 180–185° C. bath temperatures.

*Formula*

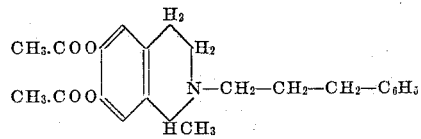

(4) A mixture of 0.6 gr. of 1-methyl-6,7-dipropionyloxy-3,4-dihydroisoquinoline and 0.8 gr. of γ-phenylallylbromid are heated to 60° C. for 10 minutes. The mixture is triturated with ether and filtered with suction. The obtained 1-methyl-2-(γ - phenylallyl) - 6,7 - dipropionyloxy-3,4-dihydroisoquinolinium-bromide is dissolved in the 10-fold amount of propionic acid and reduced by 3 hours' boiling with 1 g. of zinc dust at 100° C. The process is completed according to Example 3. The obtained 1-methyl-2-(γ-phenylallyl)-6,7-dipropionyloxy-1,2,3,4-tetrahydroisoquinoline is distilled off in high vacuo at 195–200° C. under a pressure of 0.01 mm.

*Formula*

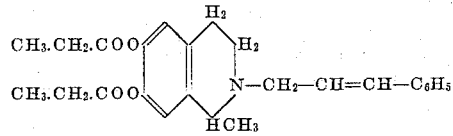

(5) 1 gr. of 1-methyl-2-(γ-phenylallyl)-6,7-dipropionyloxy-3,4 - dihydroisoquinolinium - bromide, produced according to Example 4, are shaken in 10 ccs. of propionic acid with a palladium-bariumsulfate-catalyst and hydrogen, a greater amount of hydrogen being added than was calculated for two molecules. The solution is filtered off from the catalyst and evaporated in vacuo. The residue is dissolved in water and the obtained base precipitated with soda. The obtained compound is extracted with ether. After first runnings the 1-methyl-2-(γ-phenylpropyl)-6,7 - dipropionyloxy-1,2,3,4 - tetrahydroisoquinoline is obtained and distilled off in high vacuo at 190–200° C. bath temperature.

*Formula*

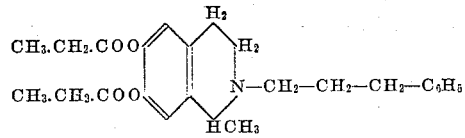

(6) 1 g. of 2-[α-methyl-β-(3',4'-diacetoxyphenyl)-ethyl] - isoquinolinium - bromide, produced by letting act homophthaldialdehyde on α-methyl-β-(3,4-diacetoxy - phenyl) - ethylamine-hydrobromide, melting point 150–152° C., are heated to boiling in 5 ccs. of glacial acetic acid with 1 g. of zinc dust for 2 hours at the reflux condenser. The solution, which has decolourized, is filtered off from the hot remaining zinc dust. The filtrate is precipitated with ether and the precipitate dissolved in a little methanol and poured into icy cold, diluted ammonia in excess. The precipitating base is extracted with ether, the ethereal solution washed with icy cold, diluted sodium hydroxide dried and evaporated. The residue, i. e. the 2-[α-methyl-β-(3',4'-diacetoxyphenyl)-ethyl]-1,2,3,4-tetrahydroisoquinoline is distilled off in high vacuo under 0.01 mm. pressure at temperatures ranging between 180 and 185° C. bath temperature.

*Formula*

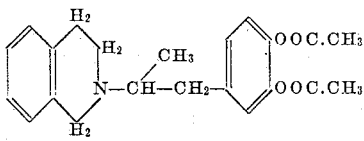

(7) 2.0 grs. of 1-(β-phenylethyl)-6,7-diacetoxy-3,4-dihydroisoquinoline hydrobromide, melting point 142–144° C., which have been re-crystallized from a mixture consisting of absolute ether and acetic ester, are shaken in 30 ccs. of glacial acetic acid with platinum from 0.1 g. of platinum oxyde and with hydrogen. After an amount of hydrogen has been absorbed, which corresponds to 1 mole hydrogen, hydrogenation comes to a stand-still. The obtained product is filtered off from the catalyst and evaporated in vacuo. The obtained 1-(β-phenylethyl)-6,7-diacetoxy-1,2,3,4-tetrahydroisoquinoline-hydrobromide is re-crystallized from absolute ether. The hydrobromide melts at 180–181° C. From the aqueous solution of the hydrobromide the soduim carbonate solution precipiates the free base, which is unsoluble in soda lye and may be solved therein only slowly under saponification.

*Formula*

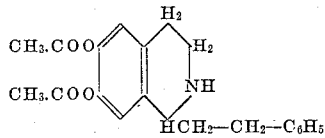

(8) 0.9 gr. of 1-(β-phenylvinyl)-6,7-diacetoxy-3,4 - dihydroisoquinoline - hydrobromide, melting point 190–191° C. are shaken in 30 ccs. of glacial acetic acid with platinum from 0.06 gr. of platinum oxyde in a hydrogen atmosphere. In the course of one hour an amount of hydrogen, corresponding to 2 mole hydrogen is taken up. After filtering off the catalyst one works up the filtrate according to Example 7. The 1-(β-phenylethyl)-6,7-diacetoxy-1,2,3,4 - tetrahydroisoquinoline-hydrobromide, which has been described in Example 7, is obtained.

(9) 2 grs. of 1-(β-phenylethyl)-2 - methyl-6,7-diacetoxy - 3,4 - dihydroisoquinolinium - iodide, melting point 175–176° C., are heated to boiling for 2 hours in 10 ccs. of glacial acetic acid with 1 g. of zinc dust. The solution, which at first was yellow, has lost all colour. The hot zinc dust is filtered off with suction. The reaction product is precipitated with ether, the precipitate dissolved in a little methanol. poured into icy cold diluted ammonia in excess and extracted with a considerable amount of ether. After evaporation of the ether, which has been washed with diluted soda lye and water and then been well dried the remaining 1-(β-phenylethyl)-2-methyl-6,7-diacetoxy - 1,2,3,4 - tetrahydroisoquinoline is distilled over in high vacuum of 0.05 mm. pressure at 210-220° C. bath temperature. By precipitation of its ethereal solution with hydrochloric acid in ether the 1-(β-phenylethyl)-2-methyl-6,7-diacetoxy-1,2,3,4- tetrahydroisoquinoline is converted into the hydrochloride, which is easily soluble in water.

*Formula*

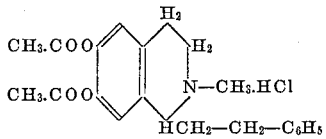

(10) 1.0 gr. of 1-(β-phenylethyl)-2-methyl-6,7-diacetoxy - 3,4 - dihydroisoquinolinium - iodide is shaken in 10 ccs. of glacial acetic acid containing platinum from 0.2 gr. platinum oxyde under hydrogen. After an amount of hydrogen has been absorbed, which corresponds to 1 mole, hydrogenation comes to a stand-still; the originally yellow solution has lost all colour. The solution is filtered off from the catalyst, evaporated in vacuo; the residue is dissolved in water and the free base precipitated with soda solution. The precipitate is extracted with ether. The ether is washed with diluted icy cold sodium hydroxide and water and then dried and evaporated. The remaining 1-(β-phenylethyl)-2-methyl - 6,7 - diacetoxy-1,2,3,4-tetrahydroisoquinoline has already been described in Example 9.

(11) 1.0 g. of 1-(β-phenylvinyl)-2-methyl-6,7-dipropionyloxy-1,2,3,4-tetrahydroisoquinoline is shaken in 10 ccs. of glacial acetic acid with platinum from 0.1 g. of platinum oxyde and with hydrogen. After an amount has been absorbed, which corresponds to 1 mole of hydrogen, hydrogenation comes to a stand-still. The hydrogenated product is filtered from the catalyst and worked up according to Example 10. The obtained 1-(β-phenylethyl)-2-methyl-6,7 - dipropionyloxy-1,2,3,4-tetrahydroisoquinoline is distilled off in high vacuo under 0.05 mm. pressure at 220-230° C. bath temperature.

*Formula*

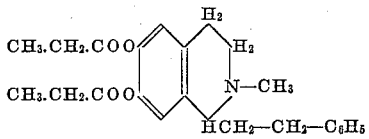

(12) 0.5 gr. of 1,3-dimethyl-2-(γ-phenylpropyl) - 6,7-dioxy - 1,2,3,4 - tetrahydroisoquinoline-hydrochloride and 3 ccs. of acetic acid anhydride are heated to boiling for one hour. Hereafter the remaining acetic acid anhydride is evaporated in vacuo and the residue is dried over night in a vacuum exsiccator charged with caustic potash. The residue is extracted with acetic ester under addition of such an amount of absolute alcohol that a lasting turbidity is observed. By trituration, preferably with vaccination crystals, complete crystallization is effected within a few minutes. 1,3-dimethyl-2-(γ-phenylpropyl)-6,7 - diacetoxy-1,2,3,4-tetrahydroisoquinoline-hydrochoride is obtained, which has already been described in Example 2.

(13) 2.0 grs. of 1,3-dimethyl-2-(γ-phenylpropyl) -6,7-dioxy - 1,2,3,4 - tetrahydroisoquinoline - hydrochloride are left standing for 24 hours at room temperature with 6 ccs. of a mixture from equal parts of acetic acid anhydride and pyridine under exclusion of moisture. After precipitation with absolute ether, filtration with suction and crystallization from absolute methanol under the addition of ether, 1,3-dimethyl-2-(γ-phenylpropyl)-6,7-diacetoxy-1,2,3,4-tetrahydroisoquinoline-hydrochloride is obtained, which has already been described in Example 2.

(14) 1.5 grs. of 1,3-dimethyl-2-(γ-phenylallyl)-6,7-dioxy-1,2,3,4 - tetrahydroisoquinoline - hydrochloride and 8 ccs. of acetic acid anhydride are heated to 100° C. for 2 hours. The remaining acetic acid anhydride is distilled off in vacuo, the residue dissolved in water. The solution is acid extracted with ether and precipitated by the addition of soda solution. The obtained 1,3-dimethyl-2-(γ-phenylallyl)-6,7-diacetoxy - 1,2,3,4 - tetrahydroisoquinoline has already been described in Example 1.

(15) 1 g. of 1 - (β - phenylethyl)-6,7 - dioxy - 1,2,3,4 - tetrahydroisoquinoline - hydrobromide, melting point 196-197° C. and a mixture of 3 grs. of acetic acid anhydride and 3 grs. of glacial acetic acid are heated to 85-90° C. for 2 hours, the substance dissolving in the course of 15 minutes. The solution is precipitated with absolute ether and filtered with suction. The precipitate is washed thoroughly with ether. The obtained 1 - (β-phenylethyl) - 6,7 - diacetoxy - 1,2,3,4-tetrahydroisoquinoline-hydrobromide described in Example 7 is re-crystallized from absolute alcohol.

(16) 1 g. of 1-(β-phenylvinyl)-2-methyl-6,7-dioxy-1,2,3,4-tetrahydroisoquinoline - hydrochloride, which, re-crystallized from alcohol, melts at 128° C. with foaming, and 3 grs. of propionic acid anhydride are heated to 80-85° C. for 3 hours. The mixture is poured into absolute ether. The hydrochloride of the dipropionylic compound is filtered with suction. The precipitate is dissolved in water and extracted with ether for purification. The obtained base is liberated by the addition of soda solution and is taken up in ether. The ether solution is washed shortly with icy cold diluted sodium hydroxide and dried. The residue of ether is dried under high vacuum. The 1-(β-phenylvinyl)-2-methyl-6,7-dipropionyloxy-1,2,3,4-tetrahydroisoquinoline is distilled off in vacuum under 0.05 mm. pressure at bath temperatures ranging between 220 and 230° C.

*Formula*

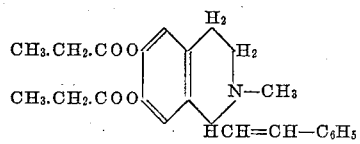

(17) 1 g. of 1-(β-phenylethyl)-2-methyl-6,7-dioxy-1,2,3,4-tetrahydroisoquinoline - hydrochloride is treated with butyric acid anhydride and worked up according to Example 16. The obtained 1-(β-phenylethyl)-2-methyl-6,7-dibutyryloxy-1,2,3,4-tetrahydroisoquinoline is distilled in high vacuo of 0.05 mm. pressure at 230-240° C. bath temperature.

*Formula*

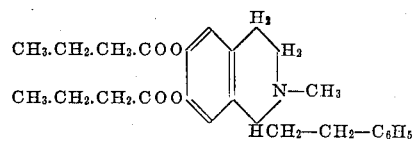

Having now particularly described and ascertained the nature of my said invention and in what manner it is to be performed I declare that what I claim is:

1. As new compounds tetrahydroisoquinoline compounds, which are substituted in the hydrogenated pyridine nucleus by an aliphatic radical, substituted by a phenyl radical and only in one benzene ring by at least two acyloxy (esterified hydroxy) groups.

2. A tetrahydroisoquinoline compound containing at least one aliphatic hydrocarbon substituent, a phenyl aliphatic substituent in the hydrogenated pyridine nucleus and at least two acyloxy substituents in only one benzene ring.

3. A tetrahydroisoquinoline compound containing a phenyl aliphatic substituent in the hydrogenated pyridine ring, at least two acyloxy substituents in only one benzene ring, and only one hydroxy group in the benzene ring free from the acyloxy groups.

4. A tetrahydroisoquinoline compound containing a phenyl aliphatic substituent in the hydrogenated pyridine ring, at least two acyloxy substituents in only one benzene ring, and at least one etherified hydroxy group selected from the group consisting of alkyloxy and alkylenedioxy groups in the benzene ring free from the acyloxy groups.

5. A tetrahydroisoquinoline compound having the formula

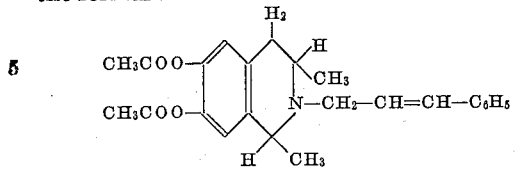

6. A tetrahydroisoquinoline compound having the formula

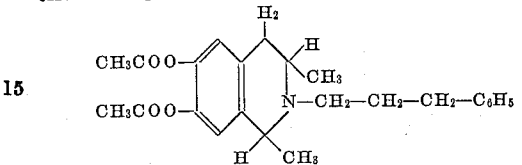

7. A tetrahydroisoquinoline compound having the formula

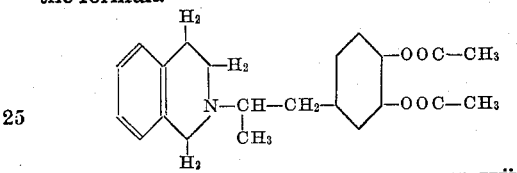

FRITZ KÜLZ.